US012476931B2

(12) United States Patent
Mendiratta (10) Patent No.: US 12,476,931 B2
(45) Date of Patent: Nov. 18, 2025

(54) AUTOMATIC DETECTION, EXTRACTION, AND MEMORIALIZATION OF MEDIA CONTENT

(71) Applicant: Avaya Management L.P., Durham, NC (US)

(72) Inventor: Harsh V. Mendiratta, East Brunswick, NJ (US)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/950,984

(22) Filed: Sep. 22, 2022

(65) Prior Publication Data

US 2024/0106783 A1 Mar. 28, 2024

(51) Int. Cl.
*H04L 51/216* (2022.01)
*G06N 3/08* (2023.01)

(52) U.S. Cl.
CPC ............ *H04L 51/216* (2022.05); *G06N 3/08* (2013.01)

(58) Field of Classification Search
CPC ................................ H04L 51/216; G06N 3/08
See application file for complete search history.

(56) References Cited

U.S. PATENT DOCUMENTS

| 8,380,875 | B1* | 2/2013 | Gilmour | G06Q 99/00 370/352 |
| 8,612,211 | B1* | 12/2013 | Shires | G10L 15/26 704/235 |
| 8,782,403 | B1* | 7/2014 | Satish | H04L 63/0435 726/1 |
| 9,202,469 | B1* | 12/2015 | Moorjani | G10L 25/78 |
| 9,544,704 | B1* | 1/2017 | John | H04S 7/302 |
| 9,563,689 | B1* | 2/2017 | Pueyo | G06F 21/6245 |
| 11,604,622 | B1* | 3/2023 | Guo | G10L 25/18 |
| 2003/0093412 | A1* | 5/2003 | Urkumyan | G06F 16/283 |
| 2005/0159136 | A1* | 7/2005 | Rouse | H04M 3/493 709/204 |
| 2006/0285545 | A1* | 12/2006 | Schmidt | H04L 65/80 370/401 |

(Continued)

FOREIGN PATENT DOCUMENTS

| CN | 113239675 A | * | 8/2021 | |
| CN | 115668371 A | * | 1/2023 | G06F 16/345 |

(Continued)

OTHER PUBLICATIONS

U.S. Appl. No. 17/950,974, filed Sep. 22, 2022, Singh et al.
Official Action for India Patent Application No. 202314061647, dated Jul. 3, 2025 6 pages.

*Primary Examiner* — Shean Tokuta
(74) *Attorney, Agent, or Firm* — Sheridan Ross P.C.

(57) ABSTRACT

Communications over a network, such as electronic conferences, often have a small portion of content that is notable within the entirety of the communications. By automatically identifying and preserving such notable portions, the relevant "nugget" from the communications may be maintained without requiring preserving the entirety of the communications. Preservation may comprise converting the notable portion to a non-fungible token and adding the token to a blockchain wherein it may be exchanged by the owner to an interested party.

20 Claims, 7 Drawing Sheets

(56) References Cited

U.S. PATENT DOCUMENTS

| | | | | |
|---|---|---|---|---|
| 2011/0033048 A1* | 2/2011 | Stanwood | ............ | H04W 72/04 |
| | | | | 380/255 |
| 2011/0116771 A1* | 5/2011 | Ota | ............ | H04N 13/128 |
| | | | | 386/343 |
| 2012/0324350 A1* | 12/2012 | Rosenblum | ............ | G06F 40/131 |
| | | | | 715/256 |
| 2013/0191452 A1* | 7/2013 | Beerse | ............ | H04L 65/403 |
| | | | | 709/204 |
| 2013/0329868 A1* | 12/2013 | Midtun | ............ | H04M 3/42221 |
| | | | | 704/235 |
| 2014/0204423 A1* | 7/2014 | Koutrika | ............ | G06F 3/1285 |
| | | | | 358/1.16 |
| 2015/0281250 A1* | 10/2015 | Miller | ............ | G06F 16/4393 |
| | | | | 726/1 |
| 2016/0344663 A1* | 11/2016 | Hwang | ............ | H04L 51/10 |
| 2018/0083792 A1* | 3/2018 | Wanderski | ............ | H04L 67/56 |
| 2018/0181626 A1* | 6/2018 | Lyons | ............ | G06Q 30/0201 |
| 2019/0121851 A1* | 4/2019 | Shires | ............ | G06F 40/279 |
| 2019/0320139 A1* | 10/2019 | Toyoda | ............ | H04N 7/147 |
| 2020/0159755 A1* | 5/2020 | Iida | ............ | G06F 40/30 |
| 2021/0065695 A1* | 3/2021 | Motosugi | ............ | G06F 40/129 |
| 2021/0350385 A1* | 11/2021 | Ellison | ............ | G06N 20/00 |

FOREIGN PATENT DOCUMENTS

| | | | | | |
|---|---|---|---|---|---|
| CN | 115967651 | A | * | 4/2023 | |
| JP | 4096132 | B2 | * | 6/2008 | |
| JP | 2008148328 | A | * | 6/2008 | |
| JP | 2011101229 | A | * | 5/2011 | ............ H04N 13/144 |
| JP | 2013054670 | A | * | 3/2013 | |
| KR | 101522616 | B1 | * | 5/2014 | |
| WO | WO-2015182436 | A1 | * | 12/2015 | ............ B41J 29/00 |

* cited by examiner

AUTOMATIC DETECTION, EXTRACTION, AND MEMORIALIZATION OF MEDIA CONTENT

FIELD OF THE DISCLOSURE

The invention relates generally to systems and methods for automatic detection of notable portions of a communication.

BACKGROUND

Conferencing services, such as those that provide audio and/or video services to connect two or more users, have become commonplace. Many communication service providers provide services for free, often with a limited feature set as compared to paid versions. For example, free conferencing services may have a reduced limit on the number of participants or a reduced time limit for the communication itself. Other features, such as recording and access to other tools (e.g., a virtual whiteboard) may also be limited. While providing free services often serves as a means to promote a paid version of the conferencing service, and the additional features provided, many users are unable or unwilling to go beyond the limited versions. As a result, communication service providers deploy and maintain numerous networking and computing resources to maintain the free conferencing services and receive no or limited support from the users of those services.

Additionally, after a communication, the participants often realize that a communication contains at least a portion of noteworthy content. Without the foresight and resources, such as selecting a paid version of a conferencing service, to enable and maintain a recording of the communication, the content of the communication, including the noteworthy portion, is lost. Communication participants are limited to their personal notes and memory to maintain a recording of the communication or at least the noteworthy portions.

SUMMARY

During an electronic communication conducted between communication devices via a network (herein, a "communication"), communication participants often utilize a particular communication service for their communication that does not provide for recording. In situations where recording is available, the participants may not believe there is any need to record the communication and fail to enable any recording services. Even if a recording is made of a communication, recording resources are not infinite and must be allocated for the recording. Accordingly, communication recordings are often time limited and, absent an action to preserve the recordings, will expire and be removed, and the space utilized to store the recordings will be released and made available for other purposes.

In one embodiment, a communication is monitored by an artificial intelligence to identify noteworthy portions of the communication. Once a noteworthy portion is identified, the noteworthy portion may be preserved. Preservation may include encoding the noteworthy portion as a non-fungible token (NFT) and added to a blockchain register. As a result, the noteworthy portion may be made available for an extended period of time, even indefinitely. Additionally or alternatively, the owner of the NFT may be monetized and thereby provided a source of revenue, such as to maintain the cost of networking resources utilized by the communication service provider.

The artificial intelligence (AI) technology may be deployed to mine a communication for potentially valuable material, such as noteworthy portions. The AI may be trained, such as to recognize an achievement by one or more of the communication participants (e.g., communication content comprising "congratulations") alone or in conjunction with another indicator, such as a significant increase in the decibel level of the audio portion of the communication content), significant swings in sentiment, etc. As a result, the AI may identify the portion, and related preceding portion, as noteworthy and signal the system to create a snippet of the communication (e.g., a five-minute audio/video portion of the communication).

The following hypothetical example further illustrates additional embodiments. In the hypothetical example, a teleportation startup called Orange Skies may not have a lot of resources to spend on conferencing. In exchange for conferencing and other communication services, Orange Skies works with a communication service provider to create a nominal fee service for conferencing which allows communications to be mined for noteworthy portions. Orange Skies has the ability to distinguish communications as eligible for mining or as private (no mining is performed). Such a designation may be performed before, during, or after a meeting—such as when all communications are recorded or mined and, those communications not timely designated as minable—are deleted and otherwise made to resemble communications that were designated as non-minable before the communication began.

After Orange Skies runs trials for a new technology, the trial results are announced in a conference call between the Orange Skies founder, developers, and testers. It is announced that the first trial is a success, and the call becomes a celebration. The company may subsequently grow and become successful. Creating a non-fungible token (NFT) of a portion of the celebratory call, such as a portion of the call where the participants are cheering and clapping, preserves an important moment in the company's history.

That moment of the communication may be preserved and optionally monetized. If the company is extremely successful, it may become a fixture of presentations of the company's early history. An owner of the NFT, which may be the conferencing service or other party, may give away, sell, rent, lease, etc. the rights to the NFT to allow others access to the NFT permanently, for a limited number of viewings, for a limited time of viewings, etc.

In another embodiment, a conferencing service may offer two service plans: a traditional, paid conferencing service plan, or an alternative conferencing service plan featuring new capabilities which may be free or cost a nominal fee and which allows a customer (e.g., a startup) to grant rights to the conferencing company for creating sellable artifacts from any hosted free or nominal fee communication.

In another embodiment, the user, such as Orange Skies, which may grow into a large enterprise, could deploy their own AI and capture and sell their own NFTs from their communications. Revenue may be shared with other parties, such as the conferencing service provider.

These and other needs are addressed by the various embodiments and configurations of the present invention. The present invention can provide a number of advantages depending on the particular configuration. These and other advantages will be apparent from the disclosure of the invention(s) contained herein.

Exemplary aspects are directed to:

A system for memorializing a notable portion of a communication, comprising: a network interface to a network; a processor; a computer-readable medium coupled to the processor, the medium comprising one or more computer-readable instructions, the processor executing the one of more computer-readable instructions to: receive, via the network interface, a communication comprising communication content being exchanged between a plurality of communication devices over the network; and automatically preserve the notable portion in response to identifying the notable portion.

A method memorializing a notable portion of a communication, comprising: receiving, via a network interface, a communication comprising communication content being exchanged between a plurality of communication devices over the network; and automatically preserve the notable portion in response to identifying the notable portion.

A system, comprising: means to receive, via a network interface, a communication comprising communication content being exchanged between a plurality of communication devices over the network; means to automatically preserve the notable portion in response to identifying the notable portion; and wherein the means to identify the notable portion comprises means to provide the communication content to a neural network trained to determine notable portions therefrom and receiving indicia of the notable portion from the neural network.

Any of the above aspects:

Wherein identifying the notable portion comprises the processor providing the communication content to a neural network trained to determine notable portions therefrom and receiving indicia of the notable portion from the neural network.

Wherein the neural network is trained via a computer-implemented method, comprising: collecting a set of prior communication content from a database; applying one or more transformations to each set of prior communication content including altering a sentiment, altering the volume of an audio portion of the communication content, altering a level of animation of images of participants in a video portion of the communication content, inserting a change in topic, removing a change in topic, adding a negating word, adding an achievement word, removing the achievement word, adding an achievement image, removing the achievement image, adding an achievement pattern of speech, removing the achievement pattern of speech, removing the negating word, adding a stop word, or removing a stop word to create a modified set of prior communication content; creating a first training set comprising the collected set of prior communication content, the modified set of communication content, and a set of non-notable communication content; training the neural network in a first stage using the first training set; creating a second training set for a second stage of training comprising the first training set and the set of non-notable communication content that are incorrectly detected as notable communication content after the first stage of training; and training the neural network in the second stage using the second training set.

Wherein the notable communication content is delineated from the communication content as the start of a topic discussed in the communication content that comprises the notable portion.

Wherein the notable communication content is delineated from the communication content as the end of a topic discussed in the communication content that comprises the notable portion.

Wherein the processor receives the communication content, further comprising the processor executing instructions to terminate receiving the communication upon determining the communication is not designated as eligible for identifying notable portion therein.

Wherein the processor, upon determining the communication is designated as eligible for identifying notable portion enables at least one ancillary communication service to the communication.

Wherein the processor preserves the notable portion further comprising executing the one of more computer-readable instructions to create a non-fungible token of the notable portion.

Wherein the processor preserves the notable portion further comprising executing the one of more computer-readable instructions to add the non-fungible token to a blockchain.

Wherein identifying the notable portion comprises providing the communication content to a neural network trained to determine notable portions therefrom and receiving indicia of the notable portion from the neural network.

Wherein the neural network is trained via a computer-implemented method, comprising: collecting a set of prior communication content from a database; applying one or more transformations to each set of prior communication content including altering a sentiment, altering the volume of an audio portion of the communication content, altering a level of animation of images of participants in a video portion of the communication content, inserting a change in topic, removing a change in topic, adding a negating word, adding an achievement word, removing the achievement word, adding an achievement image, removing the achievement image, adding an achievement pattern of speech, removing the achievement pattern of speech, removing the negating word, adding a stop word, or removing a stop word to create a modified set of prior communication content; creating a first training set comprising the collected set of prior communication content, the modified set of communication content, and a set of non-notable communication content; training the neural network in a first stage using the first training set; creating a second training set for a second stage of training comprising the first training set and the set of non-notable communication content that are incorrectly detected as notable communication content after the first stage of training; and training the neural network in the second stage using the second training set.

Wherein the notable portion is delineated from the entirety of the communication content as the start of a topic discussed in the communication content that comprises the notable portion.

Wherein the notable portion is delineated from the entirety of the communication content as the end of a topic discussed in the communication content that comprises the notable portion.

Wherein receiving the communication content, further comprising terminating the receiving of the communication upon determining the communication is not designated as eligible for identifying notable portion therein.

Wherein upon determining the communication is designated as eligible for identifying notable portion enabling at least one ancillary communication service to the communication.

Wherein preserving the notable portion further comprising creating a non-fungible token of the notable portion.

Wherein preserving the notable portion further comprising adding the non-fungible token to a blockchain.

Wherein the neural network is trained via a computer-implemented method, comprising: collecting a set of prior communication content from a database; applying one or more transformations to each set of prior communication content including altering a sentiment, altering the volume of an audio portion of the communication content, altering a level of animation of images of participants in a video portion of the communication content, inserting a change in topic, removing a change in topic, adding a negating word, adding an achievement word, removing the achievement word, adding an achievement image, removing the achievement image, adding an achievement pattern of speech, removing the achievement pattern of speech, removing the negating word, adding a stop word, or removing a stop word to create a modified set of prior communication content; creating a first training set comprising the collected set of prior communication content, the modified set of communication content, and a set of non-notable communication content; training the neural network in a first stage using the first training set; creating a second training set for a second stage of training comprising the first training set and the set of non-notable communication content that are incorrectly detected as notable portions after the first stage of training; and training the neural network in the second stage using the second training set.

A system on a chip (SoC) including any one or more of the above aspects or aspects of the embodiments described herein.

One or more means for performing any one or more of the above aspects or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
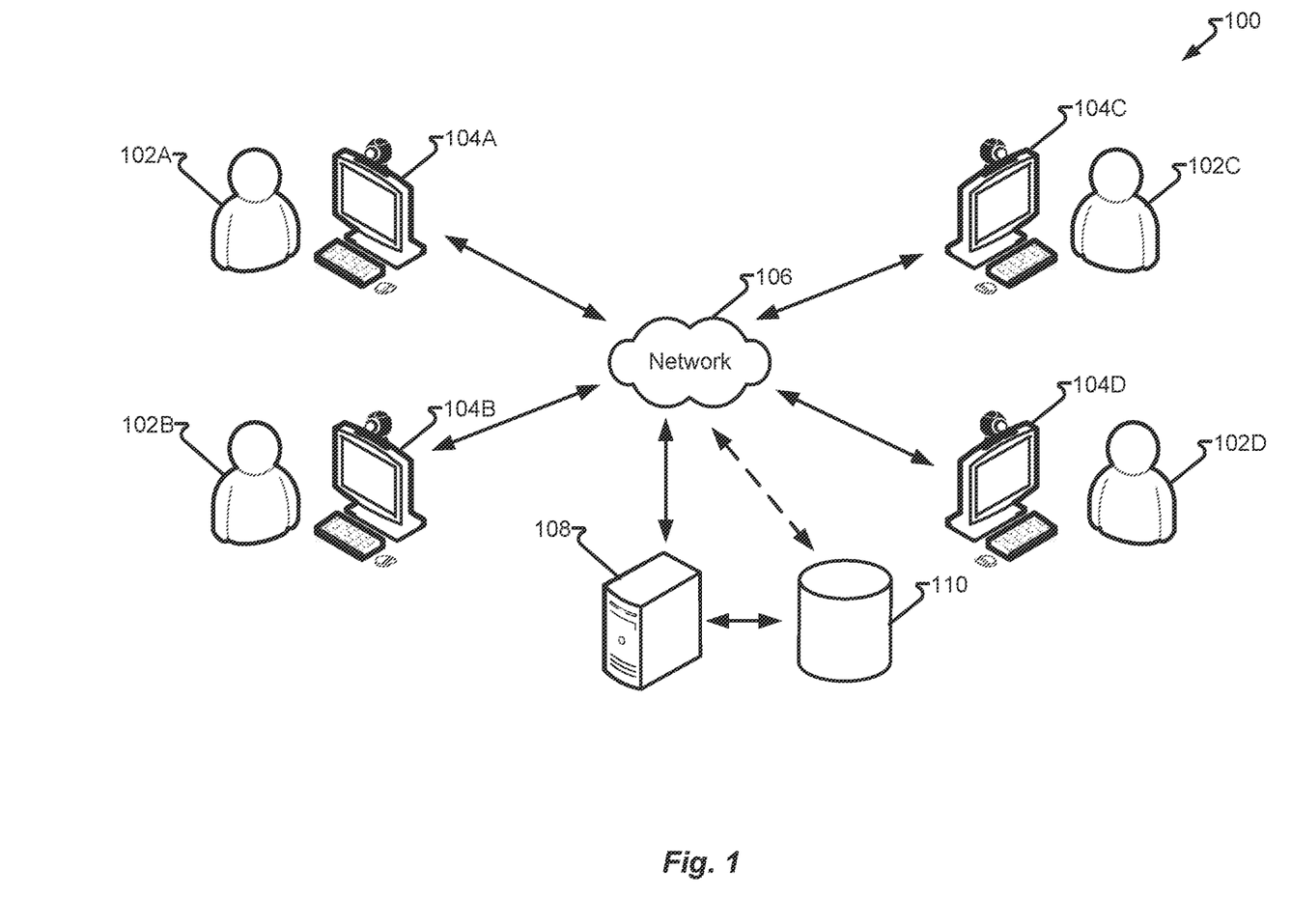
FIG. 1 depicts a system in accordance with embodiments of the present disclosure.

FIG. 1 depicts system 100 in accordance with embodiments of the present disclosure. In one embodiment, system 100 illustrates one set of components networked in first topology for conducting a communication via network 106. System 100 comprises communication devices 104A-D, utilized by users 102A-D, respectively, to conduct a communication via network 106. Embodiments of the communication include audio, video, text, electronic whiteboard, co-browsing, document sharing, and/or other forms of communication. System 100 illustrates communication devices 104A-D as personal computers in one embodiment; in other embodiments, communication devices 104A-D may comprise a mobile telephone, a wired telephone (analog and/or digital), a general-purpose computer with a telephony application (e.g., soft phone), and/or other forms of communication devices operable to utilize network 106 to exchange communication content via a communication thereon. Additionally, while system 100 illustrates communication devices 104A-D as being the same (e.g., personal computers), in other embodiments, heterogeneous devices are provided. Each of communication devices 104A-D may comprise human-machine input-output components including, but not limited to, a video display, camera, microphone, speakers. In embodiments absent any particular one of the foregoing (e.g., an analog telephone absent a camera or display) may itself (or server 108, omit the unusable portions of a communication (e.g., omitting a video portion of a communication for communication devices absent a camera and/or video-enabled display).

In another embodiment, server 108 comprises at least one processor configured with instructions to monitor the communication between communication devices 104A-D. The communication may comprise a communication presenting audio, video, images, documents, and/or other content from one or more of communication devices 104A-D. Optionally, server 108 may comprise at least one processor configured with instructions to perform communication hosting services, such as floor control, speaker queuing and management, media encoding/decoding, bandwidth monitoring and management, participant (e.g., ones of users 102A-C) approval/denial/removal, recording management, conferencing features management, etc. When server 108 is absent some or all of the conferencing hosting services, such communication hosting services may be provided by another component of system 100, such as another server (not shown) and/or one of communication devices 104A-D.

In another embodiment, server 108 monitors the audio and/or video of the communication to determine if a notable portion of the communication has occurred. If a notable portion has occurred, server 108 further performs actions to preserve the notable portion. Such preservations may be distinct from any recording of the communication. Server 108 may comprise or access, directly or via network 106, database 110 such to make content therein available to server 108. As described more completely with respect to embodiments that follow, records in database 110 are variously embodied and may include, but are not limited to, notable portions such as achievement cues which further comprise one or more of achievement words, achievement images, achievement patterns of speech, and stop words. Achievement words may be words or word combinations that indicate or foreshadow the results of a task, test, goal, process, objective, etc. For example, "I have some good news," "Congratulations!" and "We're now going to reveal the results." Achievement images may include images from a video feed capturing one or more people clapping, waving arms excitedly, hugging, "high-fiving" each other, etc. achievement patterns of speech may include the use of an excited pace of speech or tone such as celebratory screaming, saying or other excited expressions (e.g., "Yes" in an excited tone, etc.). It should also be appreciated that the notable portion may indicate a failure (e.g., "It didn't work.", images of disappointed participants, somber tone of speech). Accordingly, achievement words, images, patterns of speech, etc. may indicate a failure or lack of achievement. Stop words are words or collections of words that are ignored by processors performing natural language understanding. Stop words include, but are not limited to, indefinite articles, certain conjunctions, or words that are limited to providing improved flow or readability, for example, "a," "the," "its," "it's," etc. Database 110 may maintain other data from or for server 108 as a matter of design choice.

Figure 2:
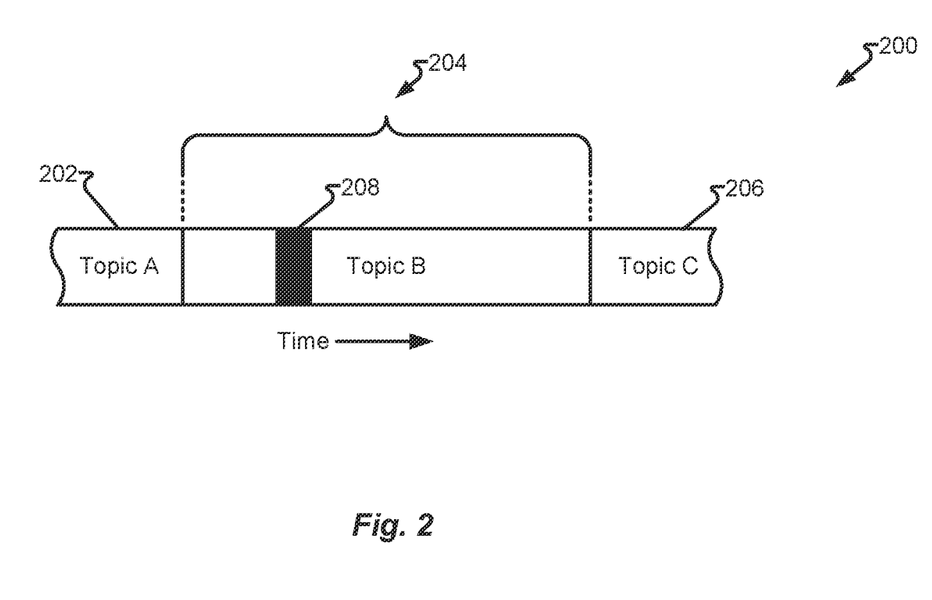
FIG. 2 depicts a communication timeline in accordance with embodiments of the present disclosure.

FIG. 2 depicts communication timeline 200 in accordance with embodiments of the present disclosure. In one embodiment, a communication is received, such as by server 108 monitoring a communication between communication devices 104A-D via network 106. Server 108 may perform sentiment analysis, such as to determine a current and/or change in sentiment, and/or topic analysis. As will be discussed more completely with respect to the embodiments that follow, the communication may comprise notable portion 208.

In one embodiment, server 108 preserves notable portion 208 only to the extent that the communication includes notable portion 208. In other words, no other portion of the communication producing communication timeline 200 is preserved. However, in other embodiments, a portion of the communication before and/or after notable portion 208 is included for preservation. In one embodiment, notable portion 208 is identified within communication timeline 200 during the discussion of topic 204 ("Topic B"). Accordingly, the portion of topic 204 preserved may be the portion before notable portion 208 and/or after notable portion 208. However, portions of communication timeline 200 that discussed other topics, such as topic 202 ("Topic A") and/or topic 206 ("Topic C") are omitted.

Figure 3:
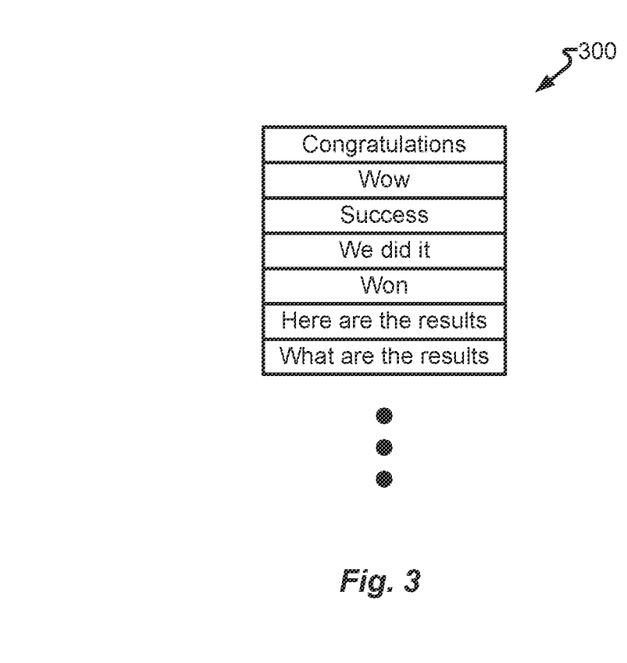
FIG. 3 depicts a data structure in accordance with embodiments of the present disclosure.

FIG. 3 depicts data structure 300 in accordance with embodiments of the present disclosure. Data structure 300 comprises a number of records of achievement words. Data structure 300 may be populated from one or more dictionary resources, such as common language words and/or industry-specific words. As a result, a common word of achievement, such as "congratulations," the notable portion may be indicated by achievement image of one or more participants in the conference, an achievement pattern of speech of one or more participants in the conference, and/or combinations thereof.

In another embodiment an industry-specific word(s), such as "FPS improved 10%", in a microprocessor development industry indicating that the number of floating-point operations per second had considerably improved and, therefore, a notable portion. In contrast, conversations with other topics (e.g., "The chance of rain has improved by 10%") may be discarded for not being associated with any achievement.

Additionally or alternatively, achievement words may be determined in conjunction with other content of a communication, such as the level of animation of the participants captured in a video portion of the communication, shouts or cheers in an audio portion, and/or other participants' spoken words (e.g., "That's amazing," "You really did it!" "The customers will love it," etc.).

In another embodiment, data structure 300 comprises achievement images and/or image descriptors (e.g., facial mapping, body position mapping, etc.) for achievement images. For example, a single person waving and/or having an "over the top" smile, a group of people celebrating with "high-fives", hugs, jumping to their feet, etc.

In another embodiment, data structure 300 comprises achievement patterns of speech comprising vocalizations (e.g., tone, rate of speech, etc.) and/or descriptors (e.g., frequency, non-speech utterances, etc.) of vocalization for achievement pattern of speech.

In yet another embodiment, data structure 300 comprises combinations of any one or more achievement cues (e.g., achievement words, achievement image, achievement pattern of speech, etc.). For example, an achievement word (e.g., "congratulations") spoken in an achievement pattern of speech (e.g., relief, excitement, etc.) indicates achievement. In contrast, an achievement word (e.g., "congratulations") spoken with flat or sad pattern of speech (i.e., not an achievement pattern of speech) may indicate sarcasm and not be an achievement cue.

Figure 4:
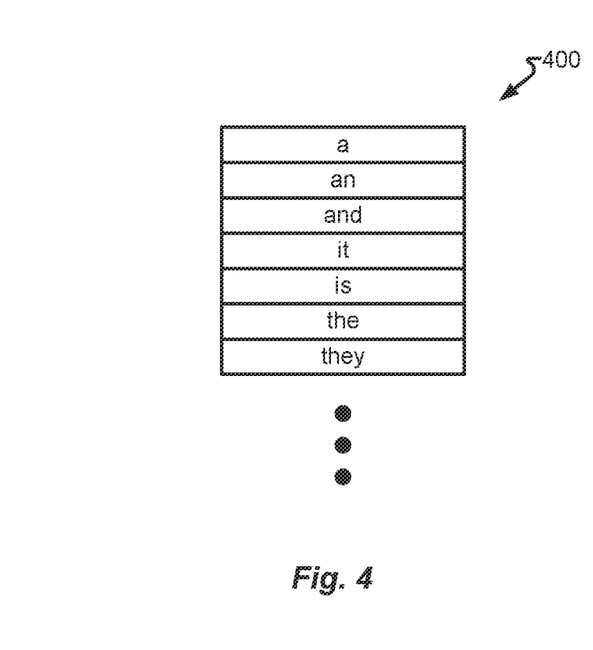
FIG. 4 depicts a data structure in accordance with embodiments of the present disclosure.

FIG. 4 depicts data structure 400 in accordance with embodiments of the present disclosure. Data structure 400 comprises a number of records of stop words. Data structure 400 may be populated from one or more dictionary resources, such as common language words and/or industry-specific words. As a result, words that are known, or learned, to convey no useful meaning may be identified and ignored, such as to save processing resources of server 108 that would otherwise be required to analyze words that convey no significant meaning.

Figure 5:
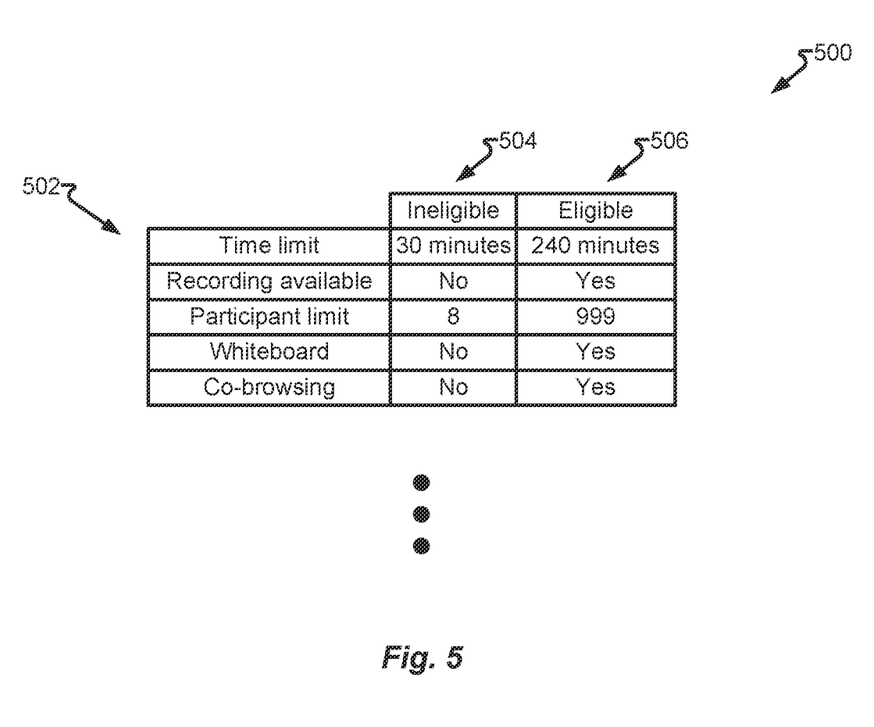
FIG. 5 depicts a data structure in accordance with embodiments of the present disclosure.

FIG. 5 depicts data structure 500 in accordance with embodiments of the present disclosure. In one embodiment, server 108 may enable (directly or via providing a signal to a communication management server or service) certain features based on the type of communication. In one embodiment, user 102A is the moderator for the communication comprising users 102B-C. User 102A has designated the communication as "private" or otherwise indicated that server 108 should not receive (or receive but discard without any further processing) the communication. In such embodiments, the communication may be identified as "ineligible" for mining for notable portions. Conversely, and in another embodiment, user 102A has designated the communication as "eligible" or otherwise indicated that server 108 should receive and "mine" the communication for notable portions.

In another embodiment, data structure 500 comprises a number of records 502 that indicate a particular communication feature and value fields for ineligible 504 (e.g., private or otherwise ineligible for "mining" notable portions) and eligible 506 (e.g., not private or otherwise eligible for "mining" notable portions). Any one or more of the records may be selected based on the current status (eligible or ineligible) of the communication and/or status of the network or other communication hosting resources and their state. For example, if user 102A is a moderator for a communication and selected "private" for the communication, then one or more records 502 and their corresponding value are ineligible 504.

Optionally, server 108 may dynamically determine one or more records 502 to select based on a current state. For example, server 108 may be simultaneously providing communication services for other users and may have a limited number of connections (e.g., ports, network addresses, etc.) nearly fully allocated. Accordingly, server 108 may select particular records 502 that would improve the availability of connections within a shorter period of time. If server 108 comprises or utilizes a recording server that is currently fully utilized or nearly fully utilized, then selecting one of records 502 that decreases the demand on the recording server may be selected. Additional or alternative limitations may also be imposed such as to disable an ancillary communication feature (e.g., disable recording, disable whiteboarding, disable co-browsing, etc.).

Conversely, and in another embodiment, if user 102A selects, or changes to, "non-private" then records 502 and their corresponding value in eligible 506 field may be selected, such as to enable one or more previously disabled ancillary communication features (e.g., enable recording, whiteboarding, co-browsing, etc.) and/or increase communication attribute limits (e.g., increase the duration limit for the communication, increase the participant limit for the communication, etc.).

Figure 6:
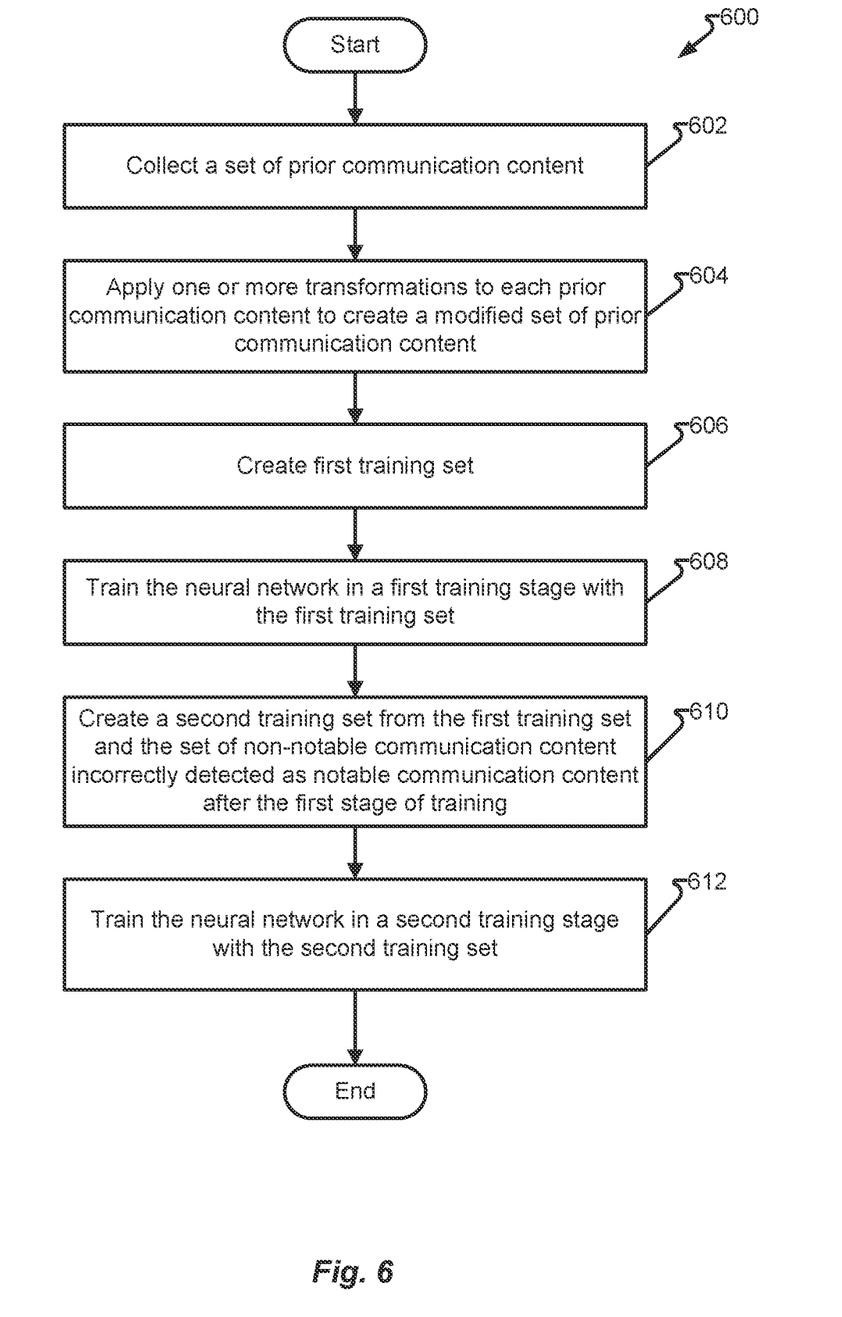
FIG. 6 depicts a process in accordance with embodiments of the present disclosure.

FIG. 6 depicts process 600 in accordance with embodiments of the present disclosure. In one embodiment, process 600 is embodied as machine-readable instructions maintained in a non-transitory memory that when read by a machine, such as processors of a server, cause the machine to execute the instructions and thereby execute process 600. The processor of the server may include, but is not limited to, at least one processor of server 108.

In one embodiment, server 108 comprises at least one processor that executes, trains, and/or utilizes an artificial intelligence (e.g., a different server and/or processor), such as a neural network trained to identify notable portions of a communication. Once the neural network is trained, server 108 provides a communication to the neural network to receive an indication (e.g., timestamp, topic, etc.) that a notable portion is present in the communication.

A neural network, as is known in the art and in one embodiment, self-configures layers of logical nodes having an input and an output. If an output is below a self-determined threshold level, the output is omitted (i.e., the inputs are within the inactive response portion of a scale and provide no output). If the self-determined threshold level is above the threshold, an output is provided (i.e., the inputs are within the active response portion of a scale and provide an output). The particular placement of the active and inactive delineation is provided as a training step or steps. Multiple inputs into a node produce a multi-dimensional plane (e.g., hyperplane) to delineate a combination of inputs that are active or inactive.

In one embodiment, process 600 trains a neural network. Process 600 begins and, in step 602, a set of prior communication content, such as audio, video, and/or other communication types (e.g., text, document sharing, whiteboarding, co-browsing inputs, etc.), is collected from conferences (in real-time or previously recorded), presentations, lectures, etc. Step 604 applies one or more transformations to each set of prior communication content to create a modified set of prior communication content. The transformations include, but not limited to, altering a sentiment, altering the volume of an audio portion of the communication content, altering a level of animation of images of participants in a video portion of the communication content, inserting a change in topic, removing a change in topic, adding a negating word, adding an achievement word, removing the achievement word, adding an achievement image, removing the achievement image, adding an achievement pattern of speech, removing the achievement pattern of speech, removing the negating word, adding a stop word, or removing a stop word.

Step 606 creates the first training set comprising the set of prior communication content, the modified set of prior communication content, and a set of non-notable communication content. The set of non-notable communication content may include, but is not limited to, topics, words, phrases, etc. that are absent any indication of notability (e.g., neutral reaction from communication participants, repetition without emotional effect, encountered in a number of prior communications known to be absent notable portions, etc.). Step 608 then trains the neural network in a first training stage with the first training set.

Step 610 creates a second training set from the first training set and the set of non-notable communication content incorrectly detected as notable communication content after the first stage of training. Step 612 then trains the neural network in a second training stage with the second training set. As a further option, the neural network may be subsequently trained, such as to cause accurate determinations of notable communication content to be enforced, and therefore more likely to be similarly determined in the future, and/or inaccurate determinations of communication content to be de-emphasized, and therefore less likely to be similarly determined in the future.

Figure 7:
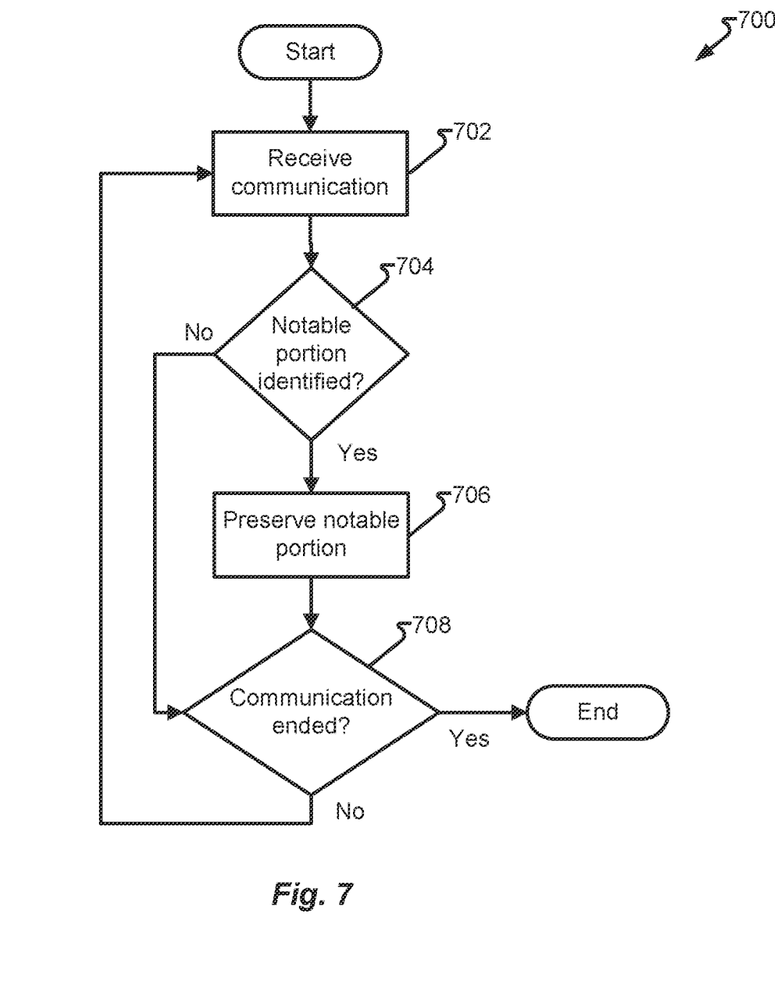
FIG. 7 depicts a process in accordance with embodiments of the present disclosure.

FIG. 7 depicts a process in accordance with embodiments of the present disclosure. In one embodiment, process 700 is embodied as machine-readable instructions maintained in a non-transitory memory that when read by a machine, such as processors of a server, cause the machine to execute the instructions and thereby execute process 700. The processor of the server may include, but is not limited to, at least one processor of server 108.

Process 700 begins and step 702 receives a communication being conducted via a network, such as a communication between two or more of communication devices 104A-D via network 106. Test 704 determines whether a notable communication portion is identified, such as by comprising an achievement cue. If test 704 is determined in the negative, processing continues to test 708. If test 704 is determined in the affirmative, processing continues to step 706.

Step 706 is variously embodied to preserve the notable portion of the communication identified in test 704. In one embodiment, the notable portion is recorded when the entirety of the communication is not recorded. In another embodiment, the notable portion is recorded as a separate recording when the entirety of the communication is recorded. In another embodiment, a non-fungible token (NFT) is created or "minted" of the notable portion which may then be added to a blockchain. Test 708 determines if the communication has ended, and if determined in the affirmative, process 700 may end. If test 708 is determined in the negative, processing may continue back to step 702, which may result in more than one execution of step 706 and, accordingly, more than one NFT.

Figure 8:
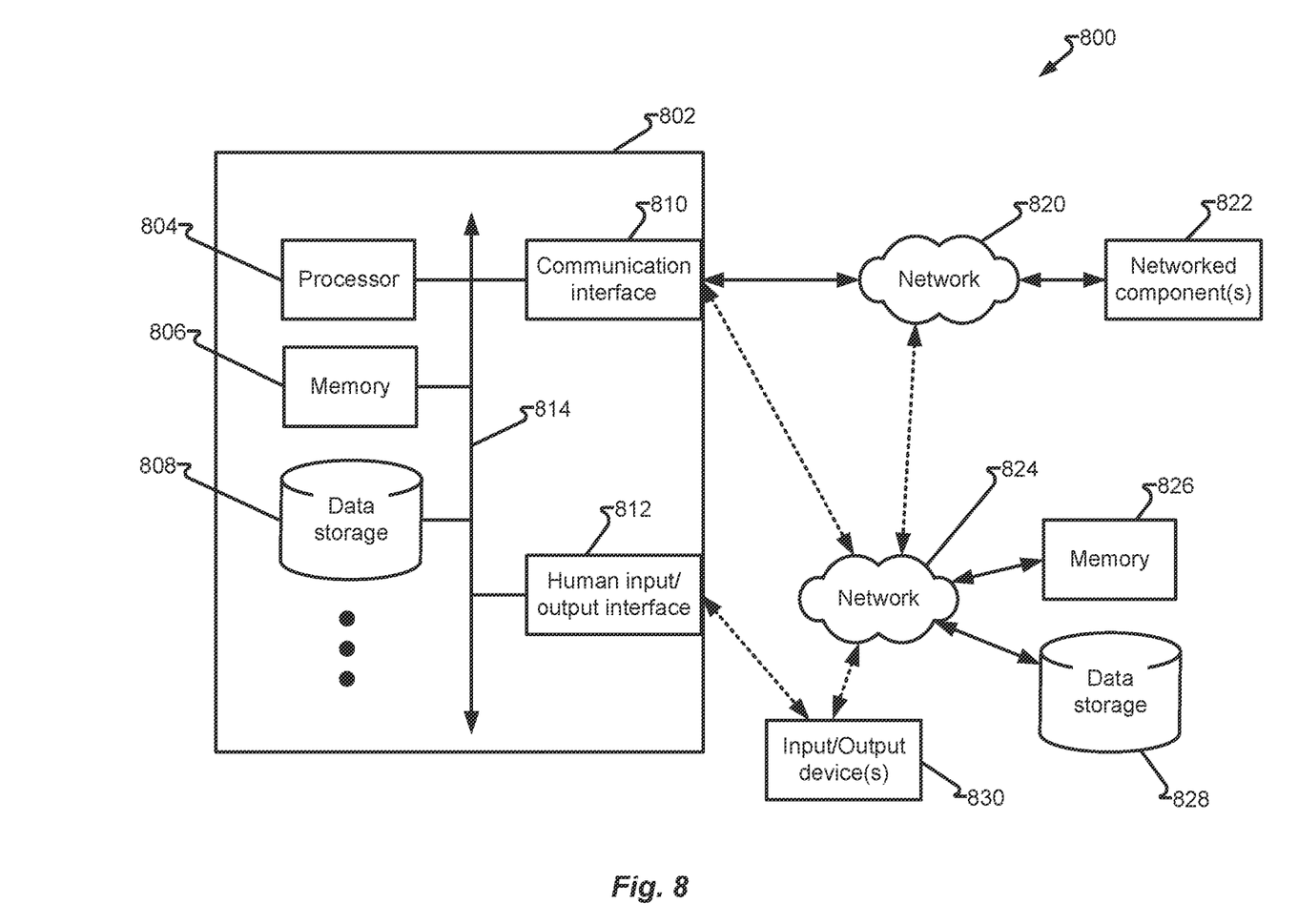
FIG. 8 depicts a system in accordance with embodiments of the present disclosure.

FIG. 8 depicts device 802 in system 800 in accordance with embodiments of the present disclosure. In one embodiment, server 108 may be embodied, in whole or in part, as device 802 comprising various components and connections to other components and/or systems. The components are variously embodied and may comprise processor 804. The term "processor," as used herein, refers exclusively to electronic hardware components comprising electrical circuitry with connections (e.g., pin-outs) to convey encoded electrical signals to and from the electrical circuitry. Processor 804 may comprise programmable logic functionality, such as determined, at least in part, from accessing machine-readable instructions maintained in a non-transitory data storage, which may be embodied as circuitry, on-chip read-only memory, computer memory 806, data storage 808, etc., that cause the processor 804 to perform the steps of the instructions. Processor 804 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 814, executes instructions, and outputs data, again such as via bus 814. In other embodiments, processor 804 may comprise a shared processing device that may be utilized by other processes and/or process owners, such as in a processing array within a system (e.g., blade, multiprocessor board, etc.) or distributed processing system (e.g., "cloud," farm, etc.). It should be appreciated that processor 804 is a non-transitory computing device (e.g., electronic machine comprising circuitry and connections to communicate with other components and devices). Processor 804 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 804). Processor 804 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 804, device 802 may utilize computer memory 806 and/or data storage 808 for the storage of accessible data, such as instructions, values, etc. Communication interface 810 facilitates communication with components, such as processor 804 via bus 814 with components not accessible via bus 814. Communication interface 810 may be embodied as a network port, card, cable, or other configured hardware device. Additionally or alternatively, human input/output interface 812 connects to one or more interface components to receive and/or present information (e.g., instructions, data, values, etc.) to and/or from a human and/or electronic device. Examples of input/output devices 830 that may be connected to input/output interface include, but are not limited to, keyboard, mouse, trackball, printers, displays, sensor, switch, relay, speaker, microphone, still and/or video camera, etc. In another embodiment, communication interface 810 may comprise, or be comprised by, human input/output interface 812. Communication interface 810 may be configured to communicate directly with a networked component or configured to utilize one or more networks, such as network 820 and/or network 824.

Network 106 may be embodied, in whole or in part, as network 820. Network 820 may be a wired network (e.g., Ethernet), wireless (e.g., WiFi, Bluetooth, cellular, etc.) network, or combination thereof and enable device 802 to communicate with networked component(s) 822. In other embodiments, network 820 may be embodied, in whole or in part, as a telephony network (e.g., public switched telephone network (PSTN), private branch exchange (PBX), cellular telephony network, etc.).

Additionally or alternatively, one or more other networks may be utilized. For example, network 824 may represent a second network, which may facilitate communication with components utilized by device 802. For example, network 824 may be an internal network to a business entity or other organization, whereby components are trusted (or at least more so) than networked components 822, which may be connected to network 820 comprising a public network (e.g., Internet) that may not be as trusted.

Components attached to network 824 may include computer memory 826, data storage 828, input/output device(s) 830, and/or other components that may be accessible to processor 804. For example, computer memory 826 and/or data storage 828 may supplement or supplant computer memory 806 and/or data storage 808 entirely or for a particular task or purpose. As another example, computer memory 826 and/or data storage 828 may be an external data repository (e.g., server farm, array, "cloud," etc.) and enable device 802, and/or other devices, to access data thereon. Similarly, input/output device(s) 830 may be accessed by processor 804 via human input/output interface 812 and/or via communication interface 810 either directly, via network 824, via network 820 alone (not shown), or via networks 824 and 820. Each of computer memory 806, data storage 808, computer memory 826, data storage 828 comprise a non-transitory data storage comprising a data storage device.

It should be appreciated that computer-readable data may be sent, received, stored, processed, and presented by a variety of components. It should also be appreciated that components illustrated may control other components, whether illustrated herein or otherwise. For example, one input/output device 830 may be a router, a switch, a port, or other communication component such that a particular output of processor 804 enables (or disables) input/output device 830, which may be associated with network 820 and/or network 824, to allow (or disallow) communications between two or more nodes on network 820 and/or network 824. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU)

that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud," multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system for memorializing a notable portion of a communication, comprising:
   a network interface to a network;
   a processor; and
   a computer-readable medium coupled to the processor, the computer-readable medium comprising one or more computer-readable instructions, the processor executing the one or more computer-readable instructions to:
      receive, via the network interface, a communication comprising communication content being exchanged between a plurality of communication devices over the network;
      automatically preserve the notable portion in response to identifying the notable portion; and
      terminate receiving the communication upon determining the communication is not designated as eligible for identifying notable portions therein.

2. The system of claim 1, wherein identifying the notable portion comprises the processor providing the communication content to a neural network trained to determine notable portions therefrom and receiving indicia of the notable portion from the neural network.

3. The system of claim 2, wherein the neural network is trained via a computer-implemented method, comprising:
   collecting a set of prior communication content from a database;
   applying one or more transformations to each set of prior communication content including altering a sentiment, altering a volume of an audio portion of the communication content, altering a level of animation of images of participants in a video portion of the communication content, inserting a change in topic, removing a change in topic, adding a negating word, adding an achievement word, removing the achievement word, adding an achievement image, removing the achievement image, adding an achievement pattern of speech, removing the achievement pattern of speech, removing the negating word, adding a stop word, or removing a stop word to create a modified set of prior communication content;
   creating a first training set comprising the set of prior communication content, the modified set of communication content, and a set of non-notable communication content;
   training the neural network in a first stage using the first training set;
   creating a second training set for a second stage of training comprising the first training set and the set of non-notable communication content that are incorrectly detected as notable portions after the first stage of training; and
   training the neural network in the second stage using the second training set.

4. The system of claim 2, wherein the notable portion is delineated from an entirety of the communication content as a start of a topic discussed in the communication content that comprises the notable portion.

5. The system of claim 2, wherein the notable portion is delineated from an entirety of the communication content as an end of a topic discussed in the communication content that comprises the notable portion.

6. The system of claim 1, wherein the processor, upon determining the communication is designated as eligible for identifying the notable portion, enables at least one ancillary communication service to the communication.

7. The system of claim 1, wherein the processor preserves the notable portion, further comprising the processor executing the one or more computer-readable instructions to create a non-fungible token of the notable portion.

8. The system of claim 7, wherein the processor preserves the notable portion, further comprising the processor executing the one or more computer-readable instructions to add the non-fungible token to a blockchain.

9. A method memorializing a notable portion of a communication, comprising:
   receiving, via a network interface, a communication comprising communication content being exchanged between a plurality of communication devices over a network; and
   automatically preserving the notable portion in response to identifying the notable portion; and
   wherein upon determining the communication is designated as eligible for identifying the notable portion, enabling at least one ancillary communication service to the communication, wherein the ancillary communication service comprises at least one of recording, whiteboarding, and co-browsing.

10. The method of claim 9, wherein identifying the notable portion comprises providing the communication content to a neural network trained to determine notable portions therefrom and receiving indicia of the notable portion from the neural network.

11. The method of claim 10, wherein the neural network is trained via a computer-implemented method, comprising:
   collecting a set of prior communication content from a database;
   applying one or more transformations to each set of prior communication content including altering a sentiment, altering a volume of an audio portion of the communication content, altering a level of animation of images of participants in a video portion of the communication content, inserting a change in topic, removing a change in topic, adding a negating word, adding an achievement word, removing the achievement word, adding an achievement image, removing the achievement image, adding an achievement pattern of speech, removing the achievement pattern of speech, removing the negating word, adding a stop word, or removing a stop word to create a modified set of prior communication content;

creating a first training set comprising the set of prior communication content, the modified set of communication content, and a set of non-notable communication content;

training the neural network in a first stage using the first training set;

creating a second training set for a second stage of training comprising the first training set and the set of non-notable communication content that are incorrectly detected as notable portions after the first stage of training; and training the neural network in the second stage using the second training set.

12. The method of claim 10, wherein the notable portion is delineated from an entirety of the communication content as a start of a topic discussed in the communication content that comprises the notable portion.

13. The method of claim 10, wherein the notable portion is delineated from an entirety of the communication content as an end of a topic discussed in the communication content that comprises the notable portion.

14. The method of claim 9, wherein receiving the communication content further comprising terminating receiving of the communication upon determining the communication is not designated as eligible for identifying the notable portion therein.

15. The method of claim 9, wherein preserving the notable portion further comprises creating a non-fungible token of the notable portion.

16. The method of claim 15, wherein preserving the notable portion further comprises adding the non-fungible token to a blockchain.

17. A system, comprising:
means to receive, via a network interface, a communication comprising communication content being exchanged between a plurality of communication devices over a network;

means to automatically preserve a notable portion in response to identifying the notable portion;

wherein the means to identify the notable portion comprise means to provide the communication content to a neural network trained to determine notable portions therefrom and receive indicia of the notable portion from the neural network; and means to terminate receiving the communication upon determining the communication is not designated as eligible for identifying notable portions therein.

18. The system of claim 17, wherein the neural network is trained via a computer-implemented method, comprising:
collecting a set of prior communication content from a database;

applying one or more transformations to each set of prior communication content including altering a sentiment, altering a volume of an audio portion of the communication content, altering a level of animation of images of participants in a video portion of the communication content, inserting a change in topic, removing a change in topic, adding a negating word, adding an achievement word, removing the achievement word, adding an achievement image, removing the achievement image, adding an achievement pattern of speech, removing the achievement pattern of speech, removing the negating word, adding a stop word, or removing a stop word to create a modified set of prior communication content;

creating a first training set comprising the set of prior communication content, the modified set of communication content, and a set of non-notable communication content;

training the neural network in a first stage using the first training set;

creating a second training set for a second stage of training comprising the first training set and the set of non-notable communication content that are incorrectly detected as notable portions after the first stage of training;

training the neural network in the second stage using the second training set; and preserving the notable portion, further comprising creating a non-fungible token of the notable portion.

19. The system of claim 18, further comprising means to add the non-fungible token to a blockchain.

20. The system of claim 17, further comprising means to, upon determining the communication is designated as eligible for identifying the notable portion, enable at least one ancillary communication service to the communication.

* * * * *